(12) United States Patent
Kaspersen et al.

(10) Patent No.: US 8,517,084 B2
(45) Date of Patent: Aug. 27, 2013

(54) HEAT RECOVERY UNIT

(75) Inventors: Terje Kaspersen, Oslo (NO); Pal Kloster, Hosle (NO); Jan Inge Sorensen, Drammen (NO)

(73) Assignee: Kanfa-Tec AS, Hvalstad (NO)

( * ) Notice: Subject to any disclaimer, the term of this patent is extended or adjusted under 35 U.S.C. 154(b) by 766 days.

(21) Appl. No.: 12/161,773

(22) PCT Filed: Jan. 22, 2007

(86) PCT No.: PCT/NO2007/000020
§ 371 (c)(1),
(2), (4) Date: Jun. 11, 2010

(87) PCT Pub. No.: WO2007/084011
PCT Pub. Date: Jul. 26, 2007

(65) Prior Publication Data
US 2010/0263831 A1 Oct. 21, 2010

(30) Foreign Application Priority Data
Jan. 23, 2006 (NO) .................................. 20060363

(51) Int. Cl.
*F28F 27/02* (2006.01)
*F28F 13/12* (2006.01)

(52) U.S. Cl.
USPC .............................. 165/103; 165/101; 165/96

(58) Field of Classification Search
CPC ....................................................... F28F 27/02
USPC ........... 165/101, 102, 103, 95, 96, DIG. 110; 138/38, 44
See application file for complete search history.

(56) References Cited

U.S. PATENT DOCUMENTS

| | | | |
|---|---|---|---|
| 27,950 | A | 4/1860 | Fletcher |
| 38,809 | A | 6/1863 | Burnell |
| 44,197 | A | 9/1864 | Hyzer |
| 47,535 | A | 5/1865 | Fletcher |
| 256,345 | A | 4/1882 | Mackintosh |

(Continued)

FOREIGN PATENT DOCUMENTS

| DE | 4207667 | 9/1993 |
|---|---|---|
| DE | 4310538 | 10/1994 |

(Continued)

OTHER PUBLICATIONS

Norwegian Search Report, Aug. 22, 2006.

*Primary Examiner* — Tho V Duong
(74) *Attorney, Agent, or Firm* — Frommer Lawrence & Haug LLP; Ronald R Santucci

(57) ABSTRACT

A heat recovery unit comprise a heat exchanger (3) which is arranged in an annular space (4) which constitutes a part of an exhaust conduit (2) from e.g. a gas turbine or diesel engine. A bypass conduit (6) for the exhaust is arranged through the annular space (4), and the distribution of exhaust flow through the heat exchanger (3) and the bypass conduit (6) is regulated by means of a regulating valve (7). The regulating valve is a rotating damper valve (7) which is arranged in the exhaust conduit (2) adjacent to the heat exchanger (3), said rotating damper valve having a stationary part (8) and a rotatable part (9) which both are provided with openings (10, 12; 11, 13) which may be brought to cover or overlap each other. Both the stationary part (8) and the rotatable part (9) are formed by two conical oppositely directed portions (8a, 8b; 9a, 9b).

10 Claims, 5 Drawing Sheets

(56) References Cited

U.S. PATENT DOCUMENTS

| | | | |
|---|---|---|---|
| 262,715 A | 8/1882 | Wood | |
| 730,386 A | 6/1903 | McDonald | |
| 1,637,681 A * | 8/1927 | Clarkson | 165/103 |
| 3,392,777 A * | 7/1968 | Edgemond, Jr. et al. | 165/283 |
| 3,418,806 A * | 12/1968 | Wagner et al. | 60/39.511 |
| 4,498,524 A | 2/1985 | Jacobson | |
| 6,302,191 B1 | 10/2001 | Wickham et al. | |
| 7,594,509 B2 * | 9/2009 | Burk | 128/205.24 |
| 2004/0206342 A1 * | 10/2004 | Moyer et al. | 123/568.12 |
| 2005/0133202 A1 | 6/2005 | Jorgensen et al. | |

FOREIGN PATENT DOCUMENTS

| | | | |
|---|---|---|---|
| GB | 1190862 A * | 5/1970 | |
| GB | 1303092 | 1/1973 | |
| WO | WO 9964806 | 12/1999 | |

* cited by examiner

HEAT RECOVERY UNIT

This application is a 371 of PCT/NO2007/000020 filed on Jan. 22, 2007, published on Jul. 26, 2007 under publication number WO 2007/084011 A1 which claims priority benefits from Norwegian Patent Application No. 2006 0363 filed Jan. 23, 2006, the disclosure of which is hereby incorporated by reference.

BACKGROUND OF THE INVENTION

Heat recovery from gas turbines is a common method for providing heat for the production of steam and hot water on offshore installations. Often there is a demand for large quantities of heat for use in the oil production or for other heat demands. Lately one has also explored the possibilities of recuperating heat for producing steam for injection into gas turbines in order to reduce NOx emissions to the atmosphere.

The heat recovery usually takes place by letting the warm exhaust from the gas turbine flow across a tube heat exchanger in order for the heat from the exhaust to be transferred to a liquid or steam based system.

Common to all these heat recovery units is that they are very large and heavy. A typical unit for hot water generation weighs about 50 tons and is 10×8×14 meters (width×length× height). This is normally not a problem on land where there often is enough space, but it can be a problem on offshore installations where the space is limited. This is particularly true for existing platforms experiencing a demand for additional heat.

The reason for these units being so large is generally the need for regulating the amount of exhaust to be supplied to the heat recovery unit. It is therefore often necessary to have a bypass system which is very space consuming. Today it is customary to regulate the amount of exhaust supply by means of a damper. Either the damper is of the one-blade type so that; as seen from the gas turbine, there will always be an open exhaust path, or one set of dampers is installed in the main conduit and a second set is installed in the bypass conduit, said sets working together. The disadvantage of this latter solution is that faulty operation may result in a blocked outlet as seen from the gas turbine.

In addition to the heat exchanger, a typical heat recovery unit will comprise a muffler, a regulating valve, a bypass system, a heat exchanger housing and an outlet chimney.

U.S. Pat. No. 6,302,191 suggests a different solution which has an integral bypass conduit. In this case the heat exchanger is arranged in an annular space which constitutes part of the exhaust conduit. The annular space is delimited on the inner side by a cylindrical valve slide, which concurrently forms the outer limitation of the bypass conduit. The valve slide is movable axially between two extreme positions. In the upper position, the valve slide opens for exhaust to the heat exchanger and closes the bypass, and in the lower position it opens the bypass and closes to the heat exchanger. In middle positions the exhaust is divided between the heat exchanger and the bypass.

In an offshore plant, the cylindrical valve slide according to U.S. Pat. No. 6,302,191 would be about 3 meters in diameter and 5-10 meters long. It would have to be supported so that it could be moved axially in a simple manner since the entire regulation of the exhaust is based on the axial movement of the cylinder. This necessitates slide or roller bearings for minimizing friction, and also necessitates that the wall thickness is large enough to avoid deflections during movements of the cylinder and due to repeated heating and cooling (operational temperatures are typically 600° C.). This makes the cylinder large and heavy. It must also be supported by complicated bearings which will be located in the hot exhaust, a situation which in similar applications has caused problems. The bearings are difficult to access without dismantling the entire unit.

BRIEF SUMMARY OF THE INVENTION

The present invention aims at providing a heat recovery unit of the type mentioned above which is simple and inexpensive to produce and has low weight, and which concurrently is easy to regulate in a relatively accurate manner.

This is obtained according to the invention by a heat recovery unit as defined in claim 1. Advantageous embodiments are defined in the dependent claims.

The regulating valve according to the present solution has a relatively short and precise angular movement for controlling the amount of exhaust to be supplied to the heat exchanger. There is therefore a lower force necessary for regulating the exhaust since it is not necessary to lift the weight of a large and heavy valve element, but only friction to be overcome. In addition, the present solution may be based on common bearings for relatively small diameter shafts which can operate in high temperatures. These are found in a number of well proven applications. The bearings are small, and when arranged in a sensible manner, they may be inspected or replaced in a simple manner without dismantling the entire unit. This will simplify the maintenance considerably.

Today it is also common to use internal insulation in exhaust conduits for noise attenuation. Such insulation is also simpler to install with the present solution.

BRIEF DESCRIPTION OF THE DRAWINGS

For better understanding of the invention it will be described more closely with reference to the exemplifying embodiment shown in the appended drawings, where.

DETAILED DESCRIPTION

Figure 1:
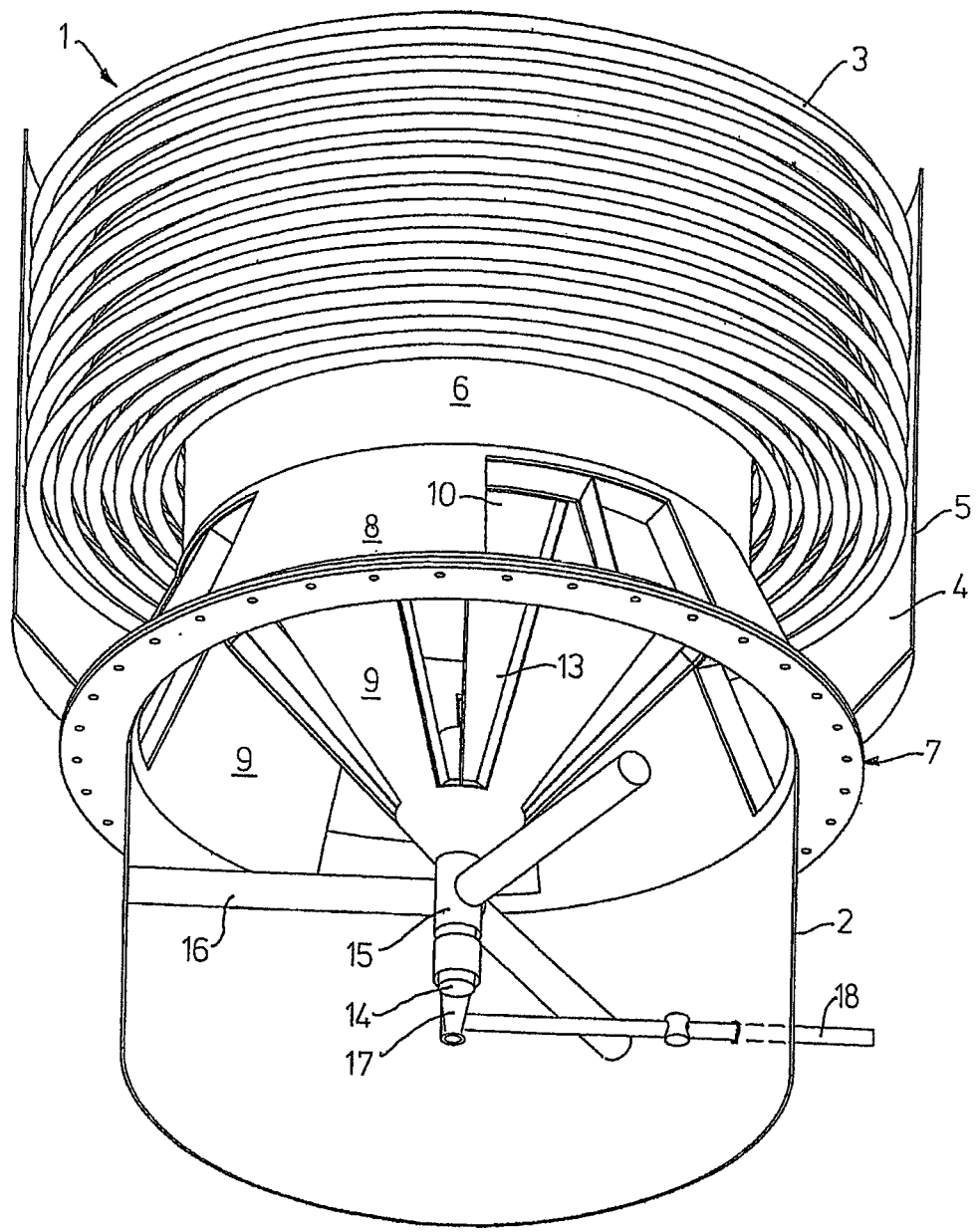
FIG. 1 is a prospective view of parts of a partly sectioned heat recovery unit in accordance with the invention with the regulating valve in a middle position.

The heat recovery unit, which is generally designated 1 in the figures, is situated in an exhaust conduit 2, which e.g. may come from a gas turbine. The heat recovery unit comprises a heat exchanger 3, of which only a part is shown. The heat exchanger is arranged in an annular space 4, which constitutes a part of the exhaust conduit and is delimited by an outer wall 5 (partly broken away) and an inner wall 6. The inner wall 6 concurrently forms a bypass conduit 6 past the heat exchanger 3.

On the inlet side of the angular space 4 for the heat exchanger 3, a regulating valve 7 is arranged for the purpose of regulating the distribution of the flowing exhaust between the heat exchanger 3 and the bypass conduit 6. The regulating valve 7, which may be called a rotating damper valve, is provided with a stationary part 8 and a rotatable part 9 which constitutes a damper. These valve parts are both provided with openings 10, 11 and 12, 13, respectively, which may be brought to overlap in pairs 10, 12; 11, 13 or to be covered by the other valve part. The openings 10, 12 face the annular space 4, while the remaining openings 11, 13 face the bypass conduit 6. With this design it will be impossible to close all the openings at the same time.

Both the stationary part 8 and the rotatable part 9 of the regulating valve 7 are put together form two conical parts. One of the conical parts 8a, 9a is located on the inner side of the other conical part 8b, 9b and has an oppositely directed conisity. The parts are concentric, the outer part 8b, 9b having a frustoconical form and being at its narrow end connected to the basis of the internal fully conical part 8a, 9a. The top angle of the frustoconical outer part 8b, 9b is somewhat smaller than the top angle for the inner part 8a, 9a. Angles and heights of the two conical parts may vary, but preferably they have about the same surface area, so that the openings 10-13 which may be made in the conical parts will have the same area. This results in the velocity of the exhaust gases through the openings being substantially the same whether the exhaust is led through the space 4 of the heat exchanger 3 or into the bypass conduit 6. This velocity should not be much more than 30 meters per second.

Figure 2:
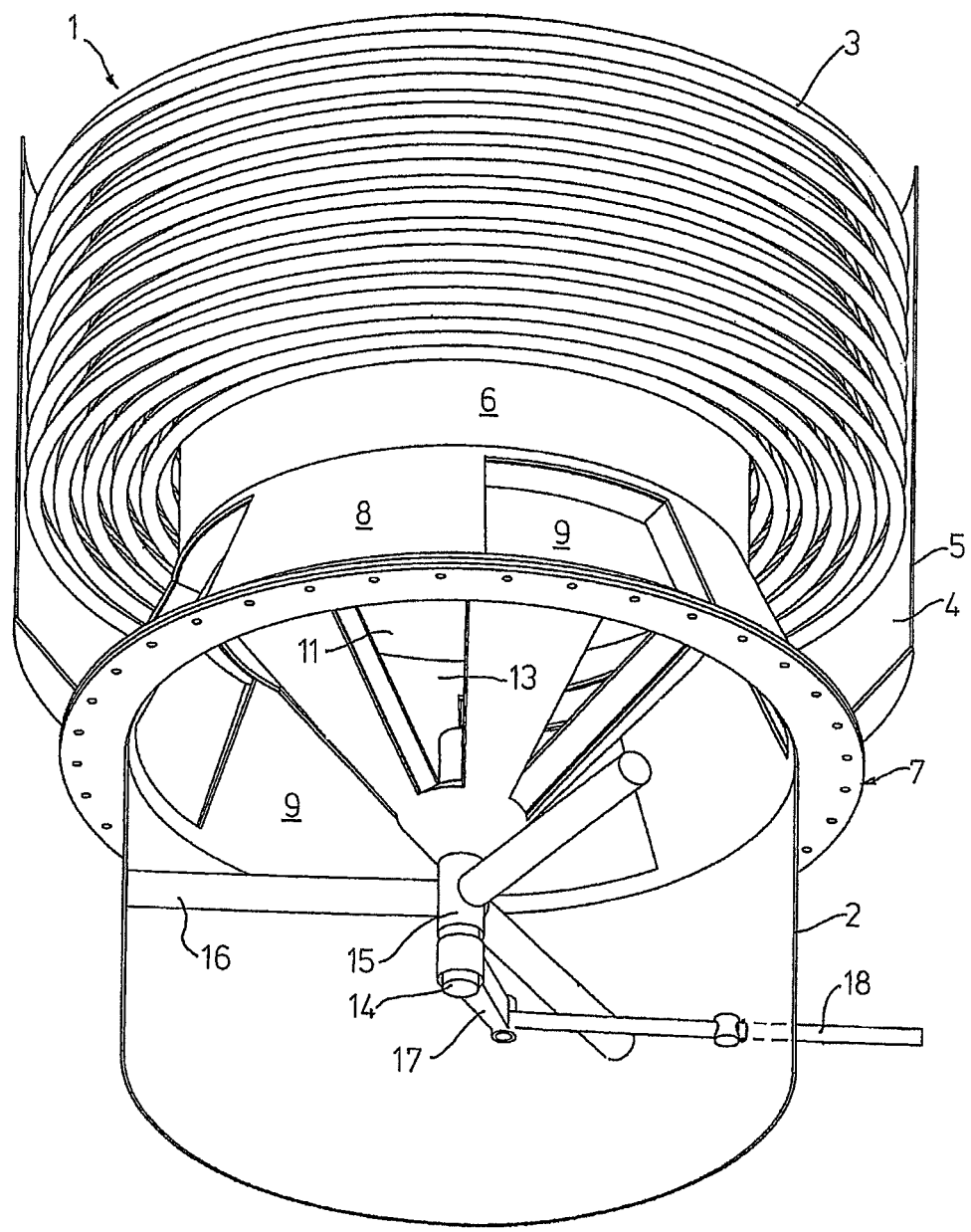
FIG. 2 shows the same unit, but with the regulating valve closed towards the heat exchanger.
Figure 3:
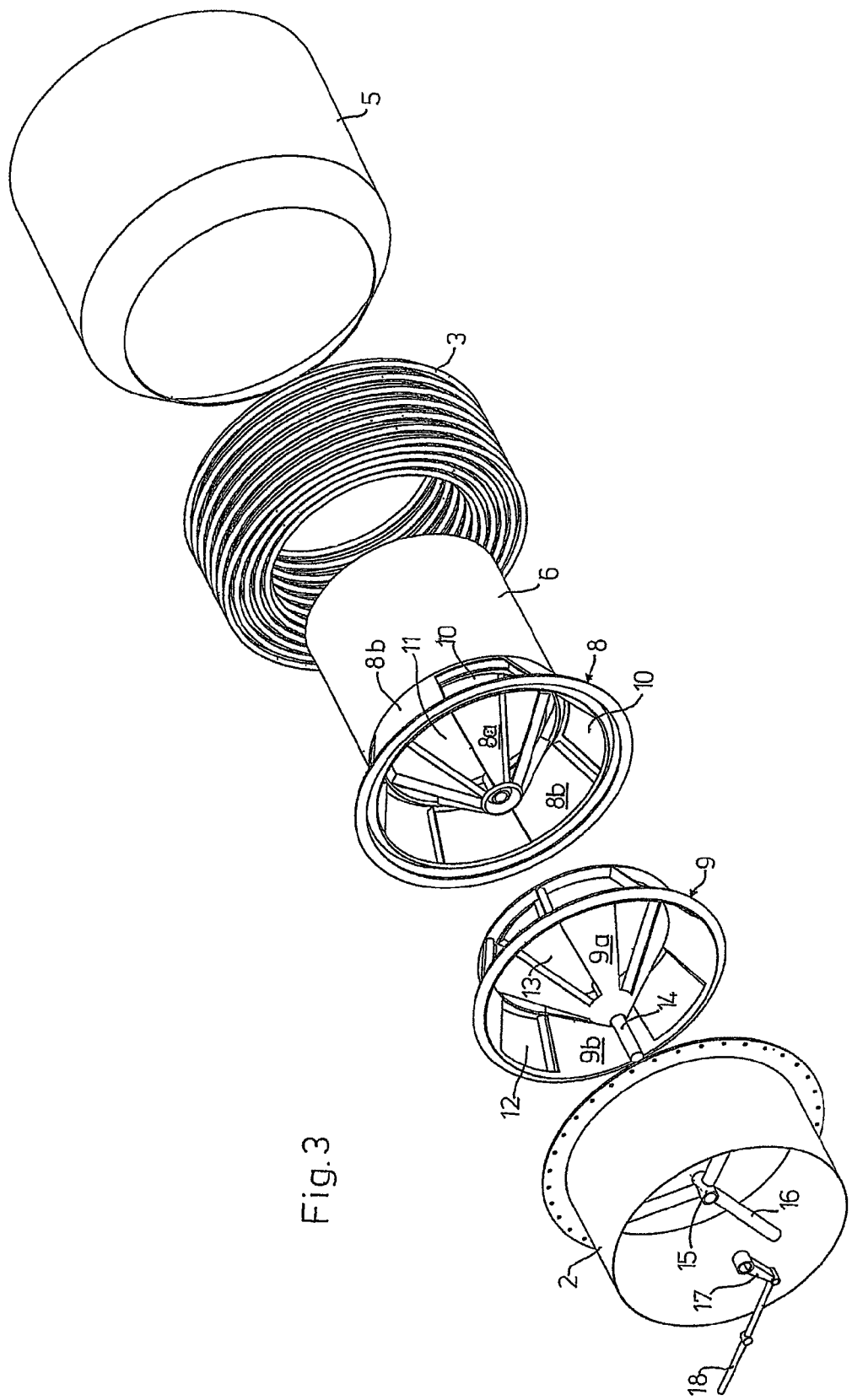
FIG. 3 shows an exploded view of the unit in FIG. 2.

The rotatable part 9 of the regulating valve 7 has a central shaft 14 which is rotatably journalled in a bearing 15 which is fixed in position by radial stays 16 or brackets supported in the exhaust conduit 2, or alternatively in a stationary part of the regulating valve 7. The shaft 14 is rotatable by means of an arm 17 and manoeuvring rod 18 extending to the outside of the exhaust conduit 2. By means of the rod 18 the shaft 14 may be rotated in order to regulate the openings 10-13 in the regulating valve. In FIG. 1 the rotatable part 9 is positioned in such a manner with respect to the stationary part 8 that all the openings 10-13 are halfway closed. By pulling on the rod 18 the openings 10, 12 may be closed even further while the openings 11, 13 are opened until the relative position shown in FIG. 2 is obtained, wherein the openings 10 towards the heat exchanger are completely closed and the openings 11 towards the bypass conduit 6 are completely open. It will be understood that the valve 7 can have any position between being completely open or completely closed towards the heat exchanger 3, and that the valve will stay in its adjusted middle position, i.a. due to the friction between the parts 8, 9, unless it is acted upon by the manoeuvring rod 18. Consequently, no external force is necessary in order to maintain a given valve position.

Figure 4:
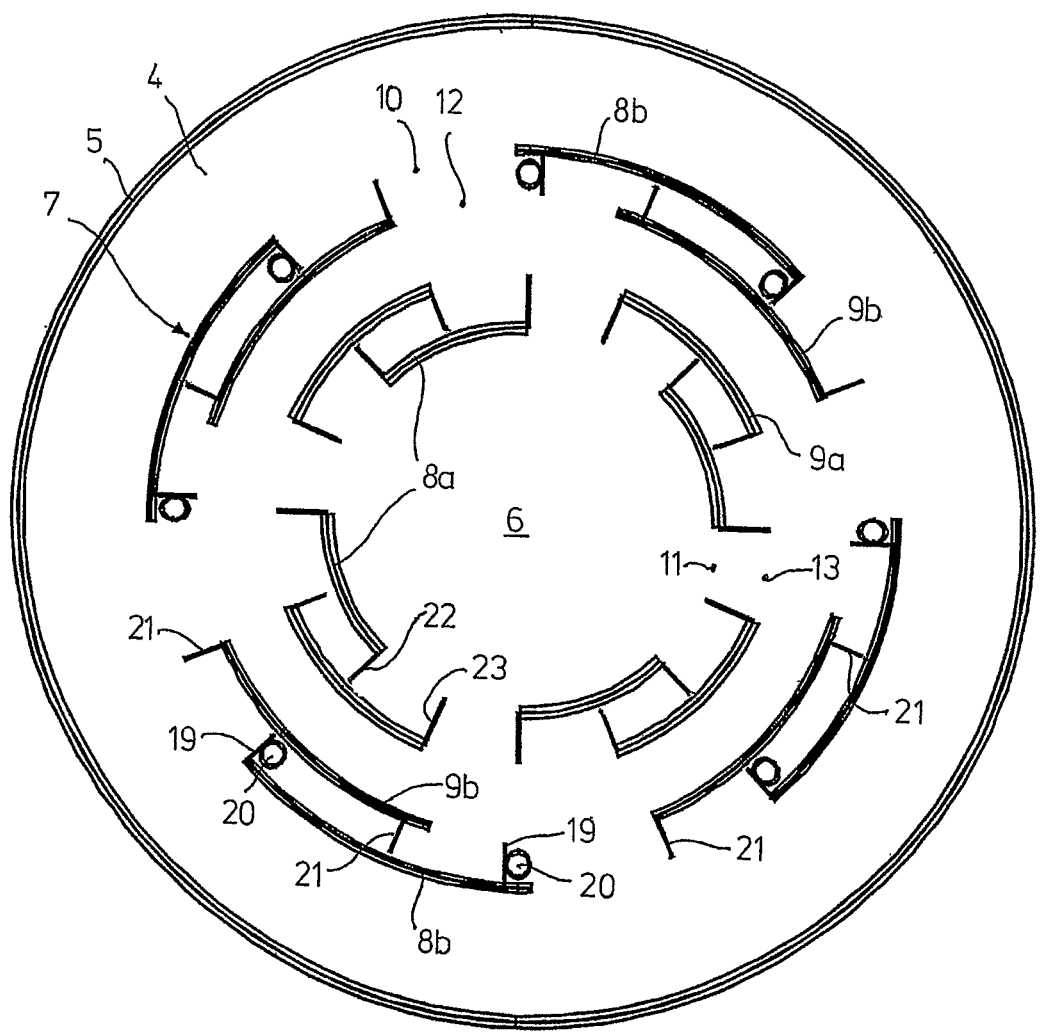
FIG. 4 shows a schematic cross section through the regulating valve.

The section shown schematically in FIG. 4 is taken perpendicularly to the longitudinal axis of the heat recovery unit close to the transition between the oppositely facing conical portions. The regulating valve 7 is in substantially the same position as in FIG. 1, i.e. with all openings 10-13 halfway open, so that the exhaust will be distributed between the annular space 4 of the heat exchanger and the bypass conduit 6. Here it will be seen that the edge portions of the openings 10 in the outer part 8b of the stationary part 8 are provided with ribs 19 which form abutments for sealing elements 20. In a corresponding manner the edge portions of the openings 12 in the outer part 9b of the rotatable part 9 have ribs 21, which by closing of the openings 10, 12 towards the annular space 4 will abut the sealing elements 20 and thereby provide a good seal against the heat exchanger when desirable, for instance if maintenance has to be done on the heat exchanger while the rest of the plant is in operation. Also the inner parts 8a, 9a of the rotating damper valve 7 are provided with ribs 22 and 23, respectively, which abut one another when the openings 11, 13 towards the bypass conduit 6 are closed and form a simple labyrinth seal. The ribs 22, 23 may themselves be provided with protruding ribs which may fit together in such a manner that a more effective labyrinth seal is formed. There are also a number of other forms of seals which will be well known to the skilled person and which may be used to advantage with the present invention.

Figure 5:
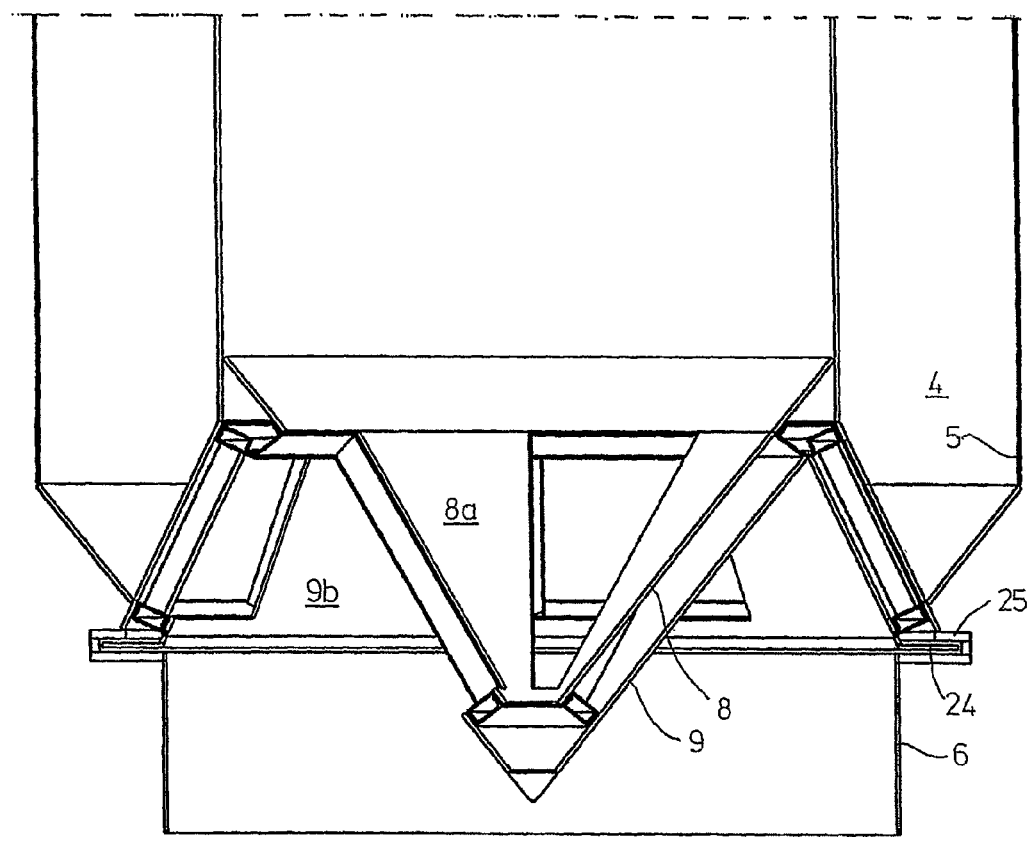
FIG. 5 shows a longitudinal section through an alternative embodiment of a heat recovery unit according to the invention.

FIG. 5 shows a longitudinal section through an alternative embodiment of the regulating valve. Here the central support with the shaft 14 in the bearing 15 is replaced by a collar 24 on the rotatable part 9 which is received in a circumferential pocket 25. The pocket 25 and possibly the stationary part 8 are provided with antifriction elements (not shown) to keep the rotatable part 9 centralised and to avoid jamming of the rotatable part when it is rotated. The rotational movement can be accomplished in several different manners which will be obvious to the skilled person, preferably in connection with the circumferential pocket 25.

It will be noted that the regulating valve in the exemplifying embodiments described above has four openings towards the heat exchanger and the bypass conduit. The number of openings towards the heat exchanger can be increased if one should wish a more even distribution of the exhaust flowing into the heat exchanger. However, one has found that four openings provide a sufficiently good distribution while at the same time allowing the structural solution to be robust and reliable and cost efficient.

It will be understood that the invention is not limited to the exemplifying embodiments described above, but may be modified and varied by the skilled person within the scope of the following claims. Even though the design having two oppositely directed conical portions becomes both compact and robust, it will be possible to let the form of the parts vary between planar and cylindrical and nevertheless obtain some of the advantages of the present invention. It will also be understood that if a particularly good closing of the exhaust against the heat exchanger is required, a valve according to the invention can be installed at both ends of the heat exchanger.

Even if the two exemplifying embodiments of the invention disclosed above both have a vertical orientation, it will be clear to the skilled person that the unit may lay horizontally, or have any other orientation if this should be desirable. The drawings show only half of the heat recovery unit. In the other half it would be natural to let the annular space 4 and bypass conduit 6 merge into a common conduit.

The invention claimed is:

1. A heat recovery unit comprising a heat exchanger arranged in an annular space delimited by an outer wall forming part of an exhaust conduit, where a bypass conduit for the exhaust is arranged inward of the annular space, a regulating valve being arranged to regulate the distribution of exhaust between the heat exchanger and the bypass conduit,
   wherein the regulating valve is a rotating damper valve which is arranged adjacent to the heat exchanger, the rotating damper valve having a stationary part and a rotatable part which both are provided with openings which may be brought to close or overlap each other,
   wherein the rotating damper valve has separate adjustable openings selectably directing the exhaust towards the heat exchanger or the bypass conduit, respectively, the openings towards the heat exchanger being arranged to open when the openings towards the bypass conduit are closed, and vice versa,
   wherein the rotating damper valve is arranged upstream of the heat exchanger, wherein the stationary part having openings towards the heat exchanger, extends between the wall of the exhaust conduit and the bypass conduit and wherein the stationary and rotatable parts both have a frustoconical or cylindrical outer part and a conical inner part, the conical inner part being located inward of the outer part and an apex of the conical part pointing in an upstream direction.

2. A heat recovery unit according to claim 1, wherein the rotatable part has a central shaft which is rotatably supported in a bearing which is fixed in place by radial stays or brackets supported in the exhaust conduit or a stationary part of the rotating damper valve, the shaft being rotatable by means of an arm and a force transmission member extending out through the exhaust conduit.

3. A heat recovery unit according to claim 1, wherein the rotatable part is provided with a collar which is received in a circumferential stationary pocket which prevents axial and radial movement of the rotatable part.

4. A heat recovery unit according to claim 3, wherein antifriction elements are arranged in said pocket in order to facilitate the rotating movement of the rotatable part.

5. A heat recovery unit according to claim 4, wherein antifriction elements are arranged also on the stationary part.

6. A heat recovery unit according to claim 1, wherein ribs are arranged along at least parts of the openings in the stationary part and the rotatable part of the rotating damper valve, the ribs serving as abutments for seals between stationary and rotatable the parts.

7. A heat recovery unit according to claim 1, wherein the rotating damper valve has four openings towards both the heat exchanger and the bypass conduit.

8. A heat recovery unit according to claim 1, wherein the openings of the rotating damper valve towards the heat exchanger have substantially the same flow area as its openings towards the bypass conduit.

9. A heat recovery unit according to claim 1, wherein the rotating damper valve is arranged in an upstream part of the exhaust conduit having a smaller diameter than said outer wall.

10. A heat recovery unit according to claim 9, wherein the outer parts are frustoconical, the top angle of the frustoconical parts being smaller than that of the conical inner parts.

* * * * *